United States Patent [19]

Quinlan

[11] 4,101,674
[45] Jul. 18, 1978

[54] HALOGEN DERIVATIVES OF ALKYNOXYMETHYL AMINES AS MICROBIOCIDES

[75] Inventor: Patrick M. Quinlan, Webster Groves, Mo.

[73] Assignee: Petrolite Corporation, St. Louis, Mo.

[21] Appl. No.: 756,217

[22] Filed: Jan. 3, 1977

Related U.S. Application Data

[62] Division of Ser. No. 556,332, Mar. 7, 1975, Pat. No. 4,026,946.

[51] Int. Cl.² .................... A01N 9/20; A01N 9/24
[52] U.S. Cl. .................................. 424/325; 424/330
[58] Field of Search ........................... 424/325, 330

[56] References Cited

U.S. PATENT DOCUMENTS

| | | | |
|---|---|---|---|
| 2,297,531 | 9/1942 | Bock | 260/248 NS X |
| 2,940,817 | 6/1960 | Browne | 8/116.2 |
| 3,160,664 | 12/1964 | Dawson | 424/325 |

FOREIGN PATENT DOCUMENTS

| | | | |
|---|---|---|---|
| 149,609 | 1/1970 | France | 424/325 |
| 1,474,514 | 2/1967 | France | 424/325 |

*Primary Examiner*—Albert T. Meyers
*Assistant Examiner*—D. W. Robinson
*Attorney, Agent, or Firm*—Sidney B. Ring; Hyman F. Glass

[57] ABSTRACT

This invention relates to halogen derivatives of alkynoxymethylamines and to uses thereof. The present invention may be ideally illustrated by the following equation:

$$RN(CH_2OR'C\equiv CH)_2 + 2NaOX$$
$$\rightarrow RN(CH_2OR'C\equiv CX)_2 + 2NaOH$$

where R is a substituted group, preferably hydrocarbon, such as alkyl, cycloalkyl, aryl, etc., R' is hydrocarbon, preferably alkylene, and where X is halogen.

This invention further specifically relates to the use of the halogen derivatives of alkynoxymethylamines as microbiocides in the treatment of aqueous or hydrocarbon systems.

9 Claims, No Drawings

HALOGEN DERIVATIVES OF ALKYNOXYMETHYL AMINES AS MICROBIOCIDES

This application is a division of Ser. No. 556,332 filed Mar. 7, 1975, now U.S. Pat. No. 4,026,946, issued May 31, 1977.

Application Ser. No. 496,145 filed Aug. 9, 1974, now U.S Pat. No. 4,026,807, issued May 31, 1977, relates to alkynoxymethyl amines, and most preferably bis(alkynoxymethyl) amines, and to uses for these compositions particularly as corrosion inhibitors. The present invention relates to halogen derivatives of the alkynoxymethyl amines of Ser. No. 496,145.

The compositions of Ser. No. 496,145 may be ideally illustrated by the following equation $$RNH_2 + CH_2O + R'OH \rightarrow RN(CH_2OR')_2$$

where R is a substituted group, preferably hydrocarbon such as alkyl, aryl, cycloalkyl, etc. and substituted derivatives thereof, etc., and R' is an alkynyl moiety.

The reaction of Ser. No. 496,145 is carried out by reacting the amine, aldehyde, and acetylenic alcohol under dehydrating conditions. The alkynoxymethyl amine is formed. In practice the amine is gradually added to a mixture of formaldehyde and acetylenic alcohol in an azeotropic solvent at reflux until the theoretical amount of water is removed. Thereupon the product is separated from the reaction mixture, for example by distillation under reduced pressure.

A wide variety of amines having at least one primary group can be employed. They include aliphatic, cycloaliphatic, aryl, heterocyclic, etc. amines. These amines may or may not contain other groups. The following are representative examples.

n-Butyl amine
Monoisopropanolamine
Hexylamine
Heptylamine
Octylamine
Decylamine
Furfurylamine
Dodecylamine
Monoethanolamine
n-Amylamine
Sec-amylamine
2-amino-4-methylpentane
4-amino-2-butanol
5-isopropylamino-1-pentanol Also, high molecular weight aliphatic amines known as Armeen 10, Armeen 16D, Armeen HTD, Armeen 18D, and Armeen CD can be used (RNH$_2$).

Amines having ring structures include cyclohexylamine, and various comparable amines with alkyl substituents in the ring.

Similarly, an amine, presumably obtained from Rosin Amine D and acrylonitrile, can be prepared. The structure of Rosin Amine D is as follows:

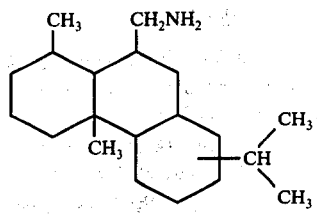

The acetylenic alcohols employed in the present invention may suitably include ethyl octynol, propargyl alcohol, hexynol and other acetylenic alcohols having the structural formula:

$$H-C\equiv C-R'-OH$$

where R' is

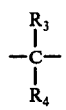

such as

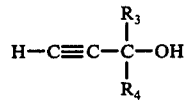

R$_3$ is selected from the group consisting of CH$_3$ and H and R$_4$ is selected from the group consisting of hydrogen, alkyl groups having 1 to 18 carbon atoms, naphthalyl, phenyl, and alkyl substituted phenyls having 1 to 10 carbon atoms in the alkyl substituent. Examples of such alcohols include: methyl butynol, methyl pentynol, hexynol, ethyl octynol, propargyl alcohol, benzyl butynol, naphthalyl butynol, and the like. Acetylenic alcohols which contain 3 to 10 carbon atoms are preferred.

Although formaldehyde is preferred, other aldehydes or ketones may be employed in place of formaldehyde such as those of the formula

where R$_1$ and R$_2$ are hydrogen or a hydrocarbon group such as alkyl, i.e., methyl, ethyl, propyl, butyl, etc.; aryl, i.e., phenyl, alkyl phenyl, etc., benzyl; cycloalkyl, i.e., cyclohexyl, etc. Thus, the —CH$_2$—group in the formula $$RN(CH_2OR')_2$$

also may include substituted —CH$_2$-groups

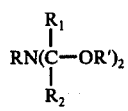

where the R$_1$ and R$_2$ are hydrogen or group derived from the aldehyde or ketone.

The following examples are illustrative of the compositions of Ser. No. 496,145.

EXAMPLE 1A

Into a 500 ml. three-necked flask provided with a reflux condenser, stirrer, and a dropping funnel were placed 30.0 g. (1 mole) of paraformaldehyde, 57.0 g. (1 mole) of propargyl alcohol, and 100 ml. of benzene. The mixture was heated to reflux and 29.5 g. (0.5 mole) of isopropyl amine was added over a thirty minute period. A Barret type water separator was placed between the flask and the reflux condenser and refluxing was continued until the theoretical amount of water was removed azeotropically. Vacuum distillation of the products gave 45.0 g. (46% of the desired product. It had the following structure:

$C_3H_7N(CH_2O\ CH_2C\equiv CH)_2$

Analysis for $C_{11}H_{17}NO_2$ (195): % N calc. 7.18, % N found 7.39 % C calc. 67.69, % C found 67.40, % H calc. 8.71, % H found 9.07.

EXAMPLE 2A

In a similar manner, 60.0 g. (2 mole) of paraformaldehyde, 114.0 g. (2 mole) propargyl alcohol and 73.0 g. (1 mole) of butyl amine were reacted together. Vacuum distillation of the products gave 141.0 g. (68%) of the desired compound. It had the following structure:

$C_4H_9N(CH_2O\ CH_2C\equiv CH)_2$

Analysis of $C_{15}H_{19}NO_2$ (209): % N calc. 6.68, % N found 6.81 % C calc. 68.90, % C found 68.33, % H calc. 9.09, % H found 9.14.

EXAMPLE 3A

In a similar manner, 95.5 g. (0.5 mole) of Primene 81-R, 30.0 g. (1 mole) of paraformaldehyde, and 57.0 g. (1 mole) of propargyl alcohol were reacted together. The product had the following structure:

$t-C_{12}H_{25}-C_{14}H_{29}N(CH_2O\ CH_2C\equiv CH)_2$

Analysis: % N calc. 4.3, % N found 5.1.

EXAMPLE 4A

In a similar manner 129.0 g. (1 mole) of t-octyl amine, 60.0 g. (2 mole) of paraformaldehyde, and 114.0 g. (2 mole) of propargyl alcohol were reacted together. Vacuum distillation of the products gave 113 g. (42.5%) of the desired compound. It had the following structure:

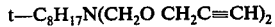

$t-C_8H_{17}N(CH_2O\ CH_2C\equiv CH)_2$

Analysis for C H NO (265): % N calc. 5.28, % N found 5.30. % C calc. 72.45, % C found 72.14, % H calc. 10.19, % H found 10.39.

EXAMPLE 5A

In a similar manner 107.0 g. (1 mole) of benzyl amine, 60.0 g. (2 mole) of paraformaldehyde, 114.0 g. (2 mole) of propargyl alcohol were reacted together. Vacuum distillation of the products gave 102 g. (42%) of the desired compound. It had the following structure:

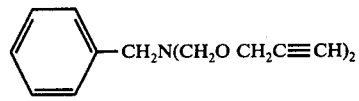

Analysis for $C_{15}H_{17}NO_2$ (243): % N calc. 5.76, % N found 6.06. % C calc. 74.07, % C found 73.74. % H calc. 6.99, % H found 6.98.

EXAMPLE 6A

In a similar manner 99.2 g. (1 mole) of cyclohexylamine, 60.0 g. (2 mole) of paraformaldehyde, and 114.0 g. (2 mole) of propargyl alcohol were reacted together. Vacuum distillation of the products gave 90.0 g. (38.3%) of the desired compound. It had the following structure:

Cyclohexyl—$N(CH_2O\ CH_2C\equiv CH)_2$

Analysis for $C_{14}H_{21}NO_2$ (235): % N calc. 5.95, % N found 5.96 % C calc. 71.49, % C found 71.24 % H calc. 8.94, % H found 8.98

EXAMPLE 7A

In a similar manner 95.5 g. (0.5 mole) of Primene 81-R, 30.0 g. (1.0 mole) of paraformaldehyde, and 98.0 g. (1 mole) of Airco OW-1 (crude hexynol) were reacted together.

EXAMPLE 8A

In a similar manner 126.0 g. (0.4 mole) of Primene JMT, 24.0 g. (0.8 mole) of paraformaldehyde, and 45.6 g. (0.8 mole) of propargyl alcohol were reacted together.

EXAMPLE 9A

In a similar manner 105 g. (0.5 mole) of Armeen C, 30.0 g. (1 mole) of paraformaldehyde, and 57.0 g. (1 mole) of propargyl alcohol were reacted together.

EXAMPLE 10A

In a similar manner 48.0 g. (0.25 mole) of Primene 81-R, 15.0 g. (0.5 mole) of paraformaldehyde, and 21.0 g. (0.5 mole) of 2-methyl-3-butyn-2-ol were reacted together.

Examples 7A–10A yielded products corresponding to the formula $RN(CH_2OR')_2$.

In order to avoid repetitive detail the following table is presented to further illustrate examples of the compositions of Ser. No. 496,145.

Table 1A

| | $RN(CH_2OR'C\equiv CH)_2$ | |
|---|---|---|
| | R | R' |
| Ex. 11A | t-$C_{12}H_{25}$ to t-$C_{14}H_{29}$ | $\begin{array}{c} H \\ -C- \\ \| \\ CH_2CH_2CH_3 \end{array}$ |
| Ex. 12A | $C_{12}H_{25}$ | $\begin{array}{c} H \\ -C- \\ \| \\ (CH_2)_4CH_3 \end{array}$ |
| Ex. 13A | t-$C_{12}H_{25}$ to t-$C_{14}H_{29}$ | $\begin{array}{c} H \\ -C- \\ \| \\ CH_3-(CH_2)_3-CH \\ \| \\ C_2H_5 \end{array}$ |

Table 1A-continued

| | R | R' |
|---|---|---|
| | | $RN(CH_2OR'C{\equiv}CH)_2$ |
| Ex. 14A | $C_6H_{11}$ | 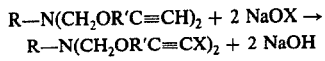 |
| Ex. 15A | $C_6H_5CH_2$ | H<br>—C—<br>|<br>$CH_2CH_2CH_3$ |
| Ex. 16A | $C_4H_9$ | H<br>—C—<br>|<br>$(CH_2)_4CH_3$ |

While the compounds of Ser. No. 496,145 may be isolated from the reaction mixture by vacuum distillation, in most cases it is more practical to use the reaction mixtures, as is, in preparing the halogen derivatives of the present invention.

The present invention may be ideally illustrated by the following equation:

$$R-N(CH_2OR'C{\equiv}CH)_2 + 2\,NaOX \rightarrow$$
$$R-N(CH_2OR'C{\equiv}CX)_2 + 2\,NaOH$$

where R is a substituted group, preferably hydrocarbon such as alkyl, aryl, cycloalkyl, etc. and substituted derivatives thereof, etc., R' is an alkylene moiety, and X is halogen.

The preparation of the halogen derivatives may be accomplished by the reaction of an alkali halide such as potassium iodide, sodium bromide and the like with sodium hypo-chloride in the presence of the N,N-Di(Alkynoxymethyl) alkyl amine. Thus the appropriate hypohalite is generated in situ in the presence of the acetylenic moiety to produce the desired halogen derivative. In brief a typical reaction would be:

Typically the acetylenic moiety is mixed with an aqueous solution of the alkali halide. To this mixture is added, with cooling, the sodium hypochlorite. The mixture is then stirred at room temperature for prolonged periods of time. In most cases the acetylenic moiety is insoluble in the reaction medium. Thus the yields are decreased, and the length of the reaction is increased. The method may be improved considerably by adding an emulsifying agent, phenolethoxylates, sodium stearate, and the like, to the reaction mixture. This allows an intimate mixture of the acetylenic moiety and the alkali hypohalite to be obtained by agitation. The products are then isolated by extraction and identified by analytical methods.

The following examples are illustrative of the preparation of compounds of the formula $RN(CH_2OR'C{\equiv}CX)_2$.

EXAMPLE 1

Into a 200 ml. three-necked flask fitted with a stirrer and dropping funnel were introduced 10.5 g. (0.05 mole) of N,N-di(propynoxymethyl) butyl amine, 16.6 g. (0.1 mole) of potassium iodide dissolved in 30 ml. of water, and 3 g. of Triton X-100*. The mixture was stirred and cooled below 20° C by means of a water bath. 70 ml. of sodium hypochlorite (10%) was then added over a period of 30 minutes. After the addition had been completed, the mixture was stirred at room temperature for 24 hours. The reaction mixture was removed from the flask and extracted three times with ether. The ethereal extracts were evaporated under reduced pressure. The product was a viscous yellow liquid. An NMR spectra indicated a complete conversion to the iodo derivative. 87% yield. Anal. % Iodine calc. = 55.2; % Iodine Found = 54.9.

*A 9-10 mole ethylene oxide adduct of octyl phenol.

EXAMPLE 2

In a similar manner 12.1 g. (0.05 mole) of N,N-di (propynoxymethyl) benzyl amine, 16.6 g. (0.1 mole) of KI, and 70 ml. of a 10% NaOCl solution, were reacted together for 30 hours. 3 g. of Triton X-100 was used as the dispersing agent. 89% yield. Anal. % Iodine calc. = 51.4; % Iodine found = 50.6.

EXAMPLE 3

In a similar manner 11.7 g. (0.05 mole) of N,N-di (propynoxymethyl) cyclohexyl amine, 16.6 g. (0.1 mole) of KI, and 70 ml. of a 10% solution of NaOCl were reacted together for 30 hours. 3 g. of Triton X-100 was used. 84.5% yield. Anal. % Iodine calc. = 52.2; % Iodine found = 52.0.

EXAMPLE 4

In a similar manner 16.4 g. (0.05 mole) of N,N-di (propynoxymethyl) t-dodecyl amine, 16.6 g. (0.1 mole) of KI and 70 ml. of a 10% NaOCl solution were reacted together for 48 hours. 4 g. of Triton X-100 was used. 85% yield.

EXAMPLE 5

In a similar manner 10.5 g. (0.05 mole) of N,N-di (propynoxymethyl) butyl amine, 10.3 g. (0.1 mole) of NaBr and 70 ml. of a 10% solution of NaOCl were reacted together for 48 hours. 92.5% yield. Anal. % Bromine calc. = 43.5; % Bromine found = 42.8.

EXAMPLE 6

In a similar manner 16.4 g. (0.05 mole) of N,N-di (propynoxymethyl) n-dodecyl amine, 16.6 g. (0.1 mole) of KI and 70 ml. of a 10% solution of NaOCl were reacted together for 40 hours. 4 g. of Triton X-100 was used. 84% yield.

In order to avoid repetitive detail the following table is presented to further illustrate examples of this invention.

Table 1

| | R | $RN(CH_2OR'C{\equiv}CX)_2$<br>R' | X |
|---|---|---|---|
| Ex. 7 | $i\text{-}C_3H_7$ | $-CH_2-$ | Br |
| Ex. 8 | $C_4H_9$ | H<br>—C—<br>|<br>$CH_2CH_2CH_3$ | I |
| Ex. 9 | $i\text{-}C_4H_9$ | H<br>—C—<br>|<br>$(CH_2)_4CH_3$ | Br |
| Ex. 10 | $C_6H_{11}$ | $CH_3$<br>—C—<br>|<br>$(CH_2)_5CH_3$ | I |
| Ex. 11 | $t\text{-}C_8H_{17}$ | H<br>—C—<br>|<br>$CH_2CH_2CH_3$ | Cl |

Table 1-continued

RN(CH₂OR'C≡CX)₂

| | R | R' | X |
|---|---|---|---|
| Ex. 12 | C₆H₁₁ | CH₃—(CH₂)₃—CH(C₂H₅)—C(H)— | Br |
| Ex. 13 | i-C₃H₇ | —CH₂— | Cl |
| Ex. 14 | n-C₁₂H₂₅ | CH₂CH₂CH₃—C(H)— | Br |

USES

This invention also relates to the inhibition of corrosion, particularly the corrosion of metals in contact with acid solutions.

The present invention is especially useful in the acidizing or treating of earth formations and wells traversed by a bore hole. It may also be used in metal cleaning and pickling baths which generally comprise aqueous solutions of inorganic acids such as sulfuric acid, hydrochloric acid, phosphoric acid and are useful in the cleaning and treatment of iron, zinc, ferrous alloys, and the like.

If no corrosion inhibitor is present when the aqueous acidic solution comes in contact with the metal, excessive metal loss and consumption or loss of acid, and other adverse results will be experienced. There has been a continuing search for corrosion inhibitors which can be used effectively in small concentrations, and which are economical to produce. The need is also for corrosion inhibitors which are effective at high temperatures, e.g., 200° F. and above, such as are found in operations involving acidic solutions, particularly oil-well acidizing where higher and higher temperatures are found as the well extends further into the earth.

While the compounds of this invention are of themselves particularly good acid corrosion inhibitors, optionally they may be blended with acetylenic alcohols, dispersing and solubilizing agents such as ethoxylated phenols, alcohols, and fatty acids. They may also be blended with such known acid inhibitors as the quinoline or alkyl pyridine quaternary compounds or synergists such as terpene alcohols, formamide, formic acid, alkyl amine, alkylene polyamines, heterocyclic amines, and the like.

Quaternary ammonium compounds may be illustrated by C-alkyl pyridine-N-methyl chloride quaternary, C-alkyl pyridine-N-benzyl chloride quaternary, quinoline-N-benzyl chloride quaternary, isoquinoline-N-benzyl chloride quaternary, thioalkyl pyridine quaternaries, thioquinoline quaternaries, benzoquinoline quaternaries, thiobenzoquinoline quaternaries, imidazole quaternaries, pyridmine quaternaries, carbazole quaternaries, the corresponding ammonium compounds, pyridines and quinolines may also be used alone or in combination with the quaternary compounds. Thus a pyridine plus quinoline quaternary, a quinoline plus quinoline quaternary, or quinoline or amine alone or in combination may be used.

The formic acid compound may be selected from the esters and amides of formic acid. The formic acid compound may be from the group consisting of formate esters of the structure:

HCOOR where R is a monoaryl group, an alkyl group having 1 to 6 carbon atoms, cyclo-alkyl residues having 5 to 6 carbon atoms, alkenyl and alkynl groups having 2 to 6 carbon atoms which may contain functional groupings selected from —C—OH, —OH, =C=O, —COOH, —SH, and NH₂. Examples of the formic acid compound are: methyl formate, ethylformate, benzyl formate, other alkyl and aryl formates, and the like. Other examples include formamide, dimethyl formamide, formanilide, and the like. Mixtures of the esters and mixtures of the amides may be used.

An alkanol may also be employed in the composition as a solvent as illustrated by methyl, ethyl, propyl, isopropyl, butyl, pentyl, hexyl, heptyl, octyl and the higher liquid members of these aliphatic alcohols.

USE IN ACID SYSTEMS

The compounds of this invention can be employed as corrosion inhibitors for acid systems, for example as illustrated by the pickling of ferrous metals, the treatment of calcareous earth formations, etc., as described in the following sections.

USE AS PICKLING INHIBITORS

This phase of the invention relates to pickling. More particularly, the invention is directed to a pickling composition and to a method of pickling ferrous metal. The term "ferrous metal" as used herein refers to iron, iron alloys and steel.

To prepare ferrous metal sheet, strip, etc. for subsequent processing, it is frequently desirable to remove oxide coating, formed during manufacturing, from the surface. The presence of oxide coating, referred to as "scale" is objectionable when the material is to undergo subsequent processing. Thus, for example, oxide scale must be removed and a clean surface provided if satisfactory results are to be obtained from hot rolled sheet and strip in any operation involving deformation of the product. Similarly, steel prepared for drawing must possess a clean surface and removal of the oxide scale therefrom is essential since the scale tends to shorten drawing-die life as well as destroy the surface smoothness of the finished product. Oxide removal from sheet or strip is also necessary prior to coating operations to permit proper alloying or adherence of the coating to the ferrous metal strip or sheet. Prior to cold reduction, it is necessary that the oxide formed during hot rolling be completely removed to preclude surface irregularities and enable uniform reduction of the work.

The chemical process used to remove oxide from metal surfaces is referred to as "pickling." Typical pickling processes involve the use of aqueous acid solutions, usually inorganic acids, into which the metal article is immersed. The acid solution reacts with the oxides to form water and a salt of the acid. A common problem in this process is "overpickling" which is a condition resulting when the ferrous metal remains in the pickling solution after the oxide scale is removed from the surface and the pickling solution reacts with the ferrous base metal. An additional difficulty in pickling results from the liberated hydrogen being absorbed by the base metal and causing hydrogen embrittlement. To overcome the aforementioned problems in pickling, it has been customary to add corrosion inhibitors to the pickling solution.

The present invention avoids the above-described problems in pickling ferrous metal articles and provides a pickling composition which minimizes corrosion, overpickling and hydrogen embrittlement. Thus the pickling inhibitors described herein not only prevent excessive dissolution of the ferrous base metal but effectively limit the amount of hydrogen absorption thereby during pickling. According to the invention, a pickling composition for ferrous metal is provided which comprises a pickling acid such as sulfuric or hydrochloric acid and a small but effective amount of the compounds of this invention, for example at least about 5 p.p.m., such as from about 100 to 50,000 p.p.m., about 500 to 30,000, but preferably from about 3,000 to 10,000 p.p.m.

Ferrous metal articles are pickled by contacting the surface (usually by immersion in the pickling solution) with a pickling composition as described to remove oxide from their surface with minimum dissolution and hydrogen embrittlement thereof and then washing the ferrous metal to remove the pickling composition therefrom.

USE IN ACIDIZING EARTH FORMATIONS

The compositions of this invention can also be used as corrosion inhibitors in acidizing media employed in the treatment of deep wells to reverse the production of petroleum or gas therefrom and more particularly to an improved method of acidizing a calcareous or magnesium oilbearing formation.

It is well known that production of petroleum or gas from a limestone, dolomite, or other calcareous-magnesian formation can be stimulated by introducing an acid into the producing well and forcing it into the oil or gas bearing formation. The treating acid, commonly a mineral acid such as HCl, is capable of forming water soluble salts upon contact with the formation and is effective to increase the permeability thereof and augment the flow of petroleum to the producing well.

Corrosion Test Procedure

In these tests the acid solutions were mixed by diluting concentrated hydrochloric acid with water to the desired concentrations.

Corrosion coupons of N-80 steel (ASTM) were pickled in an uninhibited 10% HCl solution for 10 minutes, neutralized in a 10% solution of $NaHCO_3$, dipped in acetone to remove water and allowed to dry. They were then weighed to the nearest milligram and stored in a desicator.

In most of the tests, a 25cc/$in^2$ acid volume to coupon surface area ratio was used. After the desired amount of acid was poured into glass bottles, the inhibitor was added. The inhibited acid solution was the placed in a water bath which had been set at a predetermined temperature and allowed to preheat for 20 minutes. After which time, the coupons were placed in the preheated inhibited acid solutions. The coupons were left in the acid solutions for the specified test time, then removed, neutralized, recleaned, rinsed, dipped in acetone, allowed to dry, then reweighed.

The loss in weight in grams was multiplied times a calculated factor to convert the loss in weight to lbs./$ft^2$/24 hrs. The factor was calculated as follows:

$$\frac{\frac{144 \text{ in}^2}{\text{ft}^2}}{\frac{454 \text{ g}}{\text{lb}} \times \text{Surface Area of Coupon (in}^2) \times \frac{1 \text{ day}}{24 \text{ hrs.}}} = \text{Factor}$$

The results of these tests are included below:

| Composition | Conc. in p.p.m. | Test Temp. °F. | Test Time Hrs. | Acid | Metal Type | Corrosion Rate (lbs./ft²/day) |
|---|---|---|---|---|---|---|
| Ex. 1 | 6000 | 200 | 4 | 15%HCl | N-80 | 0.051 |
| Ex. 2 | 6000 | 200 | 4 | 15%HCl | N-80 | 0.033 |
| Ex. 3 | 6000 | 200 | 4 | 15%HCl | N-80 | 0.021 |
| Ex. 4 | 6000 | 200 | 4 | 15%HCl | N-80 | 0.007 |
| Ex. 5 | 6000 | 200 | 4 | 15%HCl | N-80 | 0.063 |
| Ex. 6 | 6000 | 200 | 4 | 15%HCl | N-80 | 0.014 |
| Ex. 10 | 6000 | 200 | 4 | 15%HCl | N-80 | 0.052 |
| Blank | — | 200 | 4 | 15%HCl | N-80 | 2.220 |

Applications in which the inhibitors of the present invention are particularly useful include oil-well acidizing solutions, metal pickling, cleaning and polishing baths, boiler cleaning compositions and the like. They are also useful as oil soluble corrosion inhibitors, bactericides, water-in-oil demulsifying agents, surfactants and the like.

Static Weight Loss Tests

The test procedure involves the measurement of the corrosive action of the fluids inhibited by the composition herein described upon sandblasted S.A.E. 1020 steel coupons measuring ⅞ by 3¼ inches under conditions approximating those found in an actual producing well, and the comparison thereof with results obtained by subjecting identical test coupons to the corrosive action of identical fluids containing no inhibitor.

Clear pint bottles were charged with 200 ml. of 10% sodium chloride solution saturated with hydrogen sulfide and 200 ml. of mineral spirits and a predetermined amount of inhibitor was then added. In all cases the inhibitor concentration was based on the total volume of the fluid. Weighed coupons were then added, the bottles tightly sealed and allowed to remain at room temperature for 72 hours. The coupons were then removed, cleaned by immersion in inhibited 10% HCl, dried and weighed.

The changes in the weight of the coupons during the corrosion test were taken as a measurement of the effectiveness of the inhibitor compositions. Protection percentage was calculated for each test coupon taken from the inhibited fluids in accordance with the following formula:

$$(L_1 - L_2/L_1) \times 100 = \% \text{ Protection}$$

in which $L_1$ is the loss in weight of the coupons taken from the uninhibited fluids and $L_2$ is the loss in weight of coupons which were subjected to the inhibited fluids.

| Static Weight Loss Test | | |
|---|---|---|
| Composition | Concentration p.p.m. | % Protection |
| Ex. 1 | 100 | 90.5 |
| Ex. 2 | 100 | 92.4 |
| Ex. 3 | 100 | 91.6 |
| Ex. 4 | 100 | 98.7 |
| Ex. 5 | 100 | 88.7 |
| Ex. 6 | 100 | 97.9 |
| Ex. 11 | 100 | 94.3 |

Note: In each Example a small amount (10 p.p.m.) of a 15 mole ethylene oxide adduct of nonyl phenol was used to help solubilize the halo derivative in the corrosive fluid.

Another test was conducted in order to determine the effectiveness of the corrosion inhibitors of the present invention in the corrosive medium, tap water.

Coupons of mild steel (S.A.E. 1018) having dimensions of 5 cm × 3.5 cm × 0.32 cm were sandblasted and cleaned. They were then weighed and placed in open beakers containing tap water to which predetermined amounts of inhibitor had been added. The beakers containing the fluid were allowed to remain at room temperature for 96 hours. The coupons were then removed, cleaned, immersed in acetone, dried, and weighed.

The changes in the weight of the coupons during the corrosion test were taken as a measurement of the 96 hours. The coupons were then removed, cleaned, immersed in acetone, dried, and weighed.

The changes in the weight of the coupons during the corrosion test were taken as a measurement of the effectiveness of the inhibitor compositions. Protection percentage was calculated as the ratio of the difference between the coupon weight loss with the blank and the coupon weight loss using the inhibitor, divided by the coupon weight loss of the blank, multiplied by 100.

| Composition | Static Weight Loss Test Concentration p.p.m. | % Protection |
|---|---|---|
| Ex. 1 | 100 | 81.3 |
| 2 | 100 | 88.6 |
| 3 | 100 | 87.1 |
| 4 | 100 | 97.3 |
| 5 | 100 | 82.2 |
| 6 | 100 | 94.6 |
| 11 | 100 | 87.3 |

Note: In each example a small amount (10 p.p.m.) of a 15 mole ethylene oxide adduct of nonyl phenol was used to help solubilize the halo derivative in the corrosive fluid.

For the above type of systems, one generally employs from about 10 to 1,000 p.p.m., such as from about 20-750 p.p.m., from example from about 30-500 p.p.m., but preferably about 50-150 p.p.m. Variations above or below this amount will depend on the particular composition employed.

The compositions of the present inventions are useful as microbiocides, such as in water treatment, water flooding in secondary recovery of oil, treatment of hydrocarbons, etc. For microbiocidal use, one generally employs about 5-500 p.p.m., such as about 10-300 p.p.m., for example from about 20-200 p.p.m., but preferably about 30-100 p.p.m. Variations above or below this amount will depend on the particular composition employed.

Microbial Testing

The screening procedure was as follows: a one percent by weight solution of the test compound in water was prepared. The solution was aseptically added to a sterile broth that would support the growth of the test organism, "Desulfovibrio desulfuricans," to provide a concentration of 20, 40, 50, 75 and 100 parts by weight of test compound per million parts by weight or broth. A general growth medium, such as prescribed by the American Petroleum Institute was used. The broth containing the test compound then was dispersed in 5cc amounts into sterile disposable tubes and the tubes were inoculated with the growing test organism and incubated at 35° C for 24 hours. The absence or presence of growth of the microorganisms was determined by visual inspection by an experienced observer.

Following is a summary of the results of the testing of compositions of this invention.

| Composition Example No. | Concentration of Test Composition (p.p.m.) |
|---|---|
| 4 | 50 |
| 6 | 40 |
| 14 | 40 |

In all of the above tests no growth of the test organism occurred, thus indicating that the compound is a biostatic or a biocide.

Note

The compositions used were diluted to 50% by weight in isopropyl alcohol prior to testing. In each example a small amount (5 p.p.m.) of a 15 mole ethylene oxide adduct of nonyl phenol was used to help solubilize the halo derivative in the test solution.

I claim:

1. A process of inhibiting or preventing the growth of microorganisms in aqueous or hydrocarbon systems which comprises treating said aqueous or hydrocarbon system with about 5 to 500 p.p.m. of a compound which is a halogenated alkynoxymethyl amine having the formula $$RN(CH_2OR'C{\equiv}CX)_2$$

where R is alkyl, aryl or cycloalkyl, R' is an alkylene group having up to 8 carbon atoms and X is a halogen selected from the group consisting of chlorine, bromine and iodine.

2. The process of claim 1 where R in the formula is alkyl or aryl.

3. A process of claim 2 where R in the formula is alkyl having 3 to 12 carbon atoms.

4. A process of claim 2 where R in the formula is aryl.

5. A process of claim 1 where R' in the formula is $$-\underset{\underset{CH_2CH_2CH_3}{|}}{\overset{H}{C}}-$$

6. A process of claim 1 where the alkynoxymethyl amine has the formula $$t{-}dodecyl{-}N(CH_2OCH_2C{\equiv}CI)_2.$$

7. The process of claim 1 where the system treated is an aqueous system.

8. The process of claim 1 where the system treated is a hydrocarbon system.

9. The process of claim 1 wherein the microorganism whose growth is inhibited or prevented is *Desulfovibrio desulfuricans.*

* * * * *